(12) United States Patent
Sato (10) Patent No.: US 6,724,557 B2
(45) Date of Patent: Apr. 20, 2004

(54) MAGNETIC RECORDING APPARATUS AND MAGNETIC RECORDING METHOD

(75) Inventor: Morihiko Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 09/865,263

(22) Filed: May 25, 2001

(65) Prior Publication Data

US 2002/0048111 A1 Apr. 25, 2002

(30) Foreign Application Priority Data

May 26, 2000 (JP) ...................... P2000-155704

(51) Int. Cl.[7] ............................................... G11B 15/46
(52) U.S. Cl. .................................................... 360/73.04
(58) Field of Search .............................. 360/73.04, 32, 360/75, 77.16, 115, 63, 73.06, 130.24; 386/46, 21

(56) References Cited

U.S. PATENT DOCUMENTS

| 4,617,599 A | * | 10/1986 | Noguchi et al. | ............... 360/32 |
| 4,689,706 A | * | 8/1987 | O'Gwynn | ................... 360/75 |
| 4,945,426 A | * | 7/1990 | Okamoto et al. | ............ 360/70 |
| 5,119,255 A | * | 6/1992 | Gooch | ......................... 360/115 |
| 5,157,563 A | * | 10/1992 | Nagasawa et al. | ........ 360/77.16 |
| 5,353,176 A | * | 10/1994 | Kosuge | ......................... 360/63 |
| 5,499,148 A | * | 3/1996 | Kubota et al. | ........... 360/73.06 |
| 5,506,688 A | | 4/1996 | Narito | |
| 5,745,318 A | * | 4/1998 | Kubota et al. | ........... 360/73.06 |
| 6,452,744 B1 | * | 9/2002 | Tamaru et al. | ......... 360/130.24 |
| 6,496,646 B1 | * | 12/2002 | Ohta | .......................... 386/46 |

FOREIGN PATENT DOCUMENTS

| EP | 0543605 | 5/1993 |
| EP | 0883118 | 12/1998 |
| EP | 0978837 | 2/2000 |

* cited by examiner

*Primary Examiner*—David Hudspeth
*Assistant Examiner*—Fred F. Tzeng
(74) *Attorney, Agent, or Firm*—Sonnenschein, Nath & Rosenthal LLP (57) ABSTRACT

A magnetic recording apparatus has a rotating drum which rotates magnetic heads at a constant speed. The magnetic heads scan a magnetic tape. On a magnetic tape, an area written by each scan always includes a lateral portion of an area written by the previous scan. In this portion, old data is overwritten by new data, and writing continues. An area excluding the overwritten portion is a recording track. The running speed of the magnetic tape is changed by a system controller, and hence the recording track width can be changed.

5 Claims, 6 Drawing Sheets

MAGNETIC RECORDING APPARATUS AND MAGNETIC RECORDING METHOD

RELATED APPLICATION DATA

The present and foregoing application claims priority to Japanese Patent Application No. P2000-155704 filed May 26, 2000. All of the foregoing applications are incorporated herein by reference to the extent permitted by law.

BACKGROUND OF THE INVENTION

1. Field of the Invention

The present invention relates to magnetic recording apparatuses and magnetic recording methods for recording data on magnetic tapes, and more particularly relates to a magnetic recording apparatus and a magnetic recording method for recording digital data in a plurality of recording formats having different recording track widths.

2. Description of the Related Art

Recently, consumer-oriented and professional-oriented digital video recorders for recording digitized video data and audio data on magnetic tapes have become available for use. A digital video (DV) format is a known recording format for such digital video recorders. The DV format is a standard which is mainly used for consumer-oriented digital video recorders that use a 6.35 mm (¼ inch)-width video tape. Recorded data includes frame image data obtained by compressing and encoding each frame of an input image, audio data, and system information. Since recording signals are compressed and the recording density is increased, high-quality, long-time recording is achieved compared with a conventional system. The DVCADM format, which is based on the DV format, is adapted mainly for professional use, and it is used for the same type of video tape having a width of 6.35 mm.

When using a DV-formatted video tape and a DVCAM-formatted video tape by a video tape recorder and player having two magnetic heads which are placed on a rotating drum at opposing positions of 180 degrees, the rotating speed of the rotating drum is 9000 rpm, the tape feeding speed is 18.831 mm/s in the DV format and 28.247 mm/s in the DVCAM format, and the recording track width is 10 (m in the DV format and 15 (m in the DVCAM format.

Recording apparatuses capable of recording in the two formats, namely, the DV format and the DVCAM format, have been developed. Since the recording track width is different in each format, it is necessary to mount recording heads dedicated for the recording track width in each format. As a result, the configuration and a control system become complicated, and the production cost is thus increased.

SUMMARY OF THE INVENTION

Accordingly, it is an object of the present invention to provide a magnetic recording apparatus capable of recording data in different recording formats using a smaller number of components.

It is another object of the present invention to provide a magnetic recording method for recording data in different formats using a smaller number of components.

According to an aspect of the present invention, the foregoing objects are achieved through provision of a magnetic recording apparatus for recording data on a magnetic tape, which includes a magnetic-tape running unit for running the magnetic tape. A running-speed control unit controls the running speed of the magnetic tape. A rotating and driving unit which has a cylindrical shape rotates at a constant speed and at a predetermined angle with respect to the running direction of the magnetic tape. A data writing unit, which is provided on a cylindrical surface of the rotating and driving unit and which is rotated, scans the magnetic tape at a predetermined angle and writes data while always overwriting data in a lateral portion of an area written by the previous scan.

According to the magnetic recording apparatus, the data writing unit is rotated at a constant speed by the rotating and driving unit. An area of the magnetic tape written by each scan always includes a lateral portion of an area written by the previous scan. In this overlapping portion, old data is overwritten by new data, and writing continues. The width of an area excluding the overwritten portion varies in accordance with the running speed of the magnetic tape. The running-speed control unit controls the running speed, thus changing the recording track width. It is therefore possible to record data in a plurality of recording formats, without providing a data write unit for each recording track width.

According to another aspect of the present invention, the foregoing objects are achieved through provision of a magnetic recording method for recording data on a magnetic tape, which includes the steps of scanning the magnetic tape by a magnetic head which rotates at a constant speed and at a predetermined angle with respect to the running direction of the magnetic tape and writing data while always overwriting data in a lateral portion of an area written by the previous scan; and controlling the running speed of the magnetic tape in order that the width of a portion other than the overwritten portion of the written area has a predetermined value.

According to the magnetic recording method, the rotating speed of the magnetic head is constant. An area of the magnetic tape written by each scan always includes a lateral portion of an area written by the previous scan. In this overlapping portion, old data is overwritten by new data, and writing continues. The width of an area excluding the overwritten portion varies in accordance with the running speed of the magnetic tape. By controlling the running speed, the recording track width can be changed. It is therefore possible to record data in a plurality of formats, without providing a recording head for each recording track width.

DESCRIPTION OF THE PREFERRED EMBODIMENTS

The present invention will become apparent from the following description of the preferred embodiment with reference to the accompanying drawings.

Figure 1:
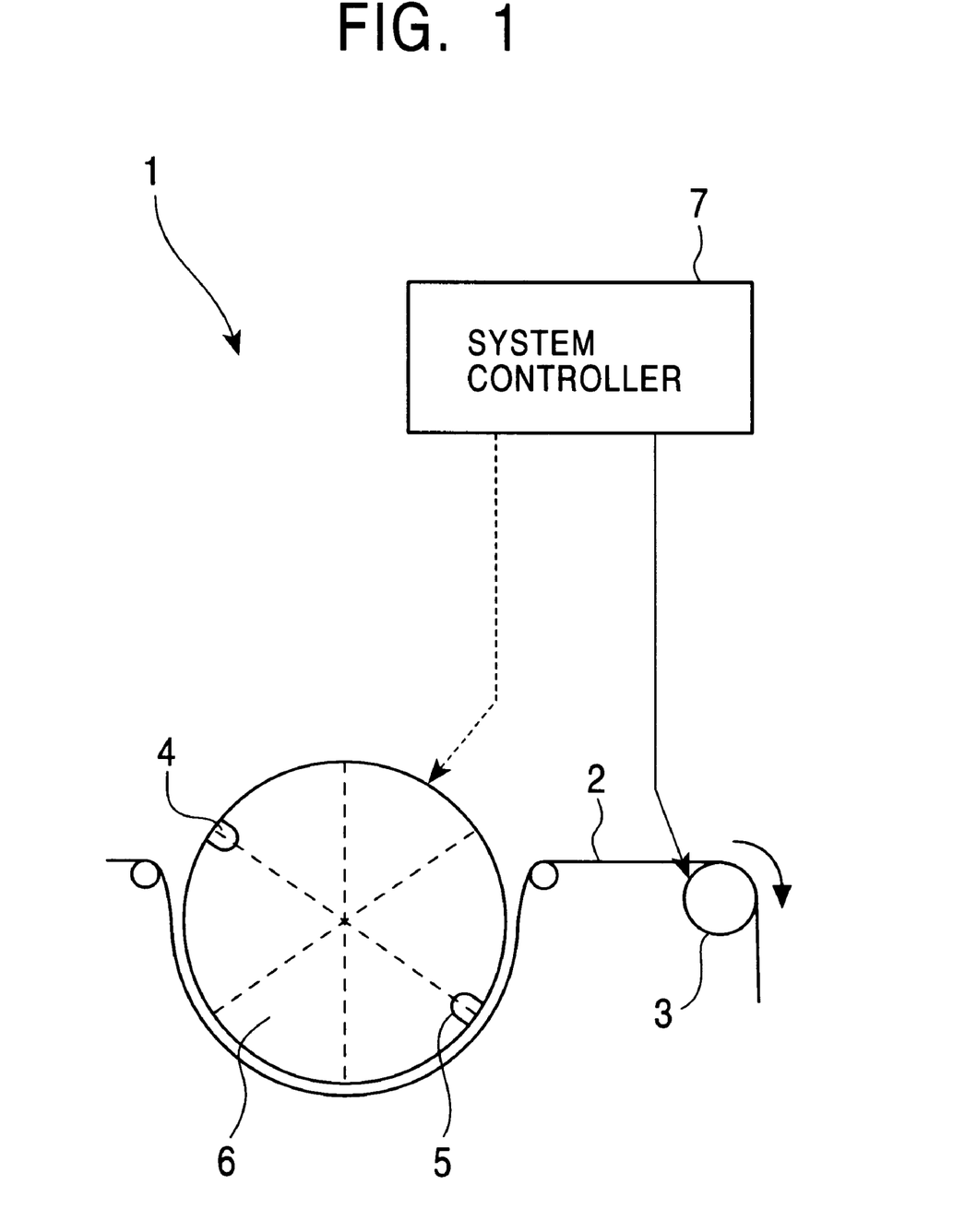
FIG. 1 is a diagram of the main components of a magnetic recording apparatus according to an embodiment of the present invention.

FIG. 1 shows the main components of a magnetic recording apparatus according to an embodiment of the present invention.

A magnetic recording apparatus 1 includes a capstan motor 3 for running a magnetic tape 2; magnetic heads 4 and 5 which come into contact with the magnetic tape 2 and which write data on the magnetic tape 2; a rotating drum 6 for rotating and driving the magnetic heads 4 and 5; and a system controller 7 for controlling the running speed of the magnetic tape 2. The magnetic tape 2 is, for example, a video tape on which image data and audio data are recorded. In the magnetic recording apparatus 1, recording is performed in digital recording formats such as the DV format and the DVCAM format. In such cases, as shown in FIG. 1, the magnetic heads 4 and 5 are used. The magnetic heads 4 and 5 are arranged on a cylindrical surface of the rotating drum 6 having a cylindrical shape. The magnetic heads 4 and 5 are opposed to each other at 180 degrees with respect to the rotation axis. In this embodiment, as long as the magnetic heads 4 and 5 are placed on the cylindrical surface of the rotating drum 6, the precise positions at which the magnetic heads are placed and the number of magnetic heads are not limited to those in this embodiment.

When recording data, the rotating drum 6 rotates at a constant speed. The magnetic tape 2 runs so as to wind itself around the cylindrical surface of the rotating drum 6. The magnetic heads 4 and 5 come into contact with the magnetic tape 2. The rotating direction of the rotating drum 6 is at a predetermined angle with respect to the running direction of the magnetic tape 2. The magnetic heads 4 and 5 which are rotated and driven by the rotating drum 6 diagonally and alternately scan the magnetic tape 2 at this angle, thus writing data to the magnetic tape 2. The magnetic heads 4 and 5 write data in such a manner as to write to a portion of an area recorded by the previous scan. In other words, the overlapping portion is overwritten. A portion of the recorded area excluding the overlapping portion is the recording track width. The recording track width varies with the running speed of the magnetic tape 2. The magnetic recording apparatus 1 uses the system controller 7 to control the running speed of the magnetic tape 2, thereby changing the recording track width. As a result, the magnetic recording apparatus 1 can record data in a plurality of recording formats.

Figure 2:
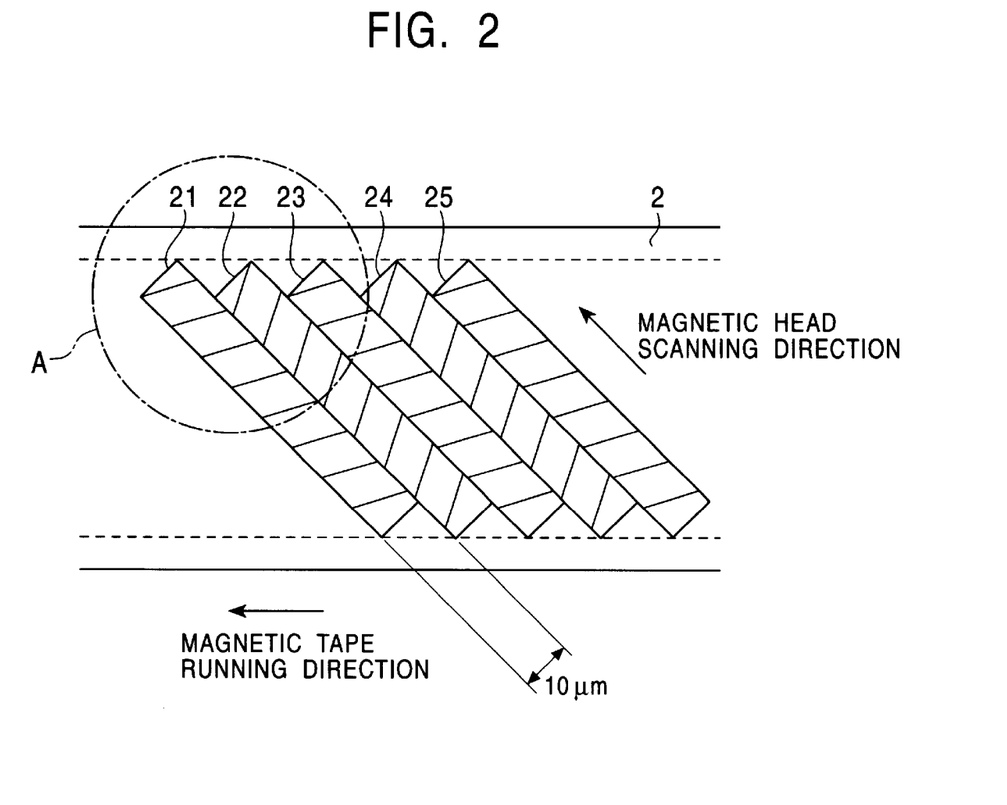
FIG. 2 illustrates a track pattern when a magnetic tape is recorded in the DV format.
Figure 3:
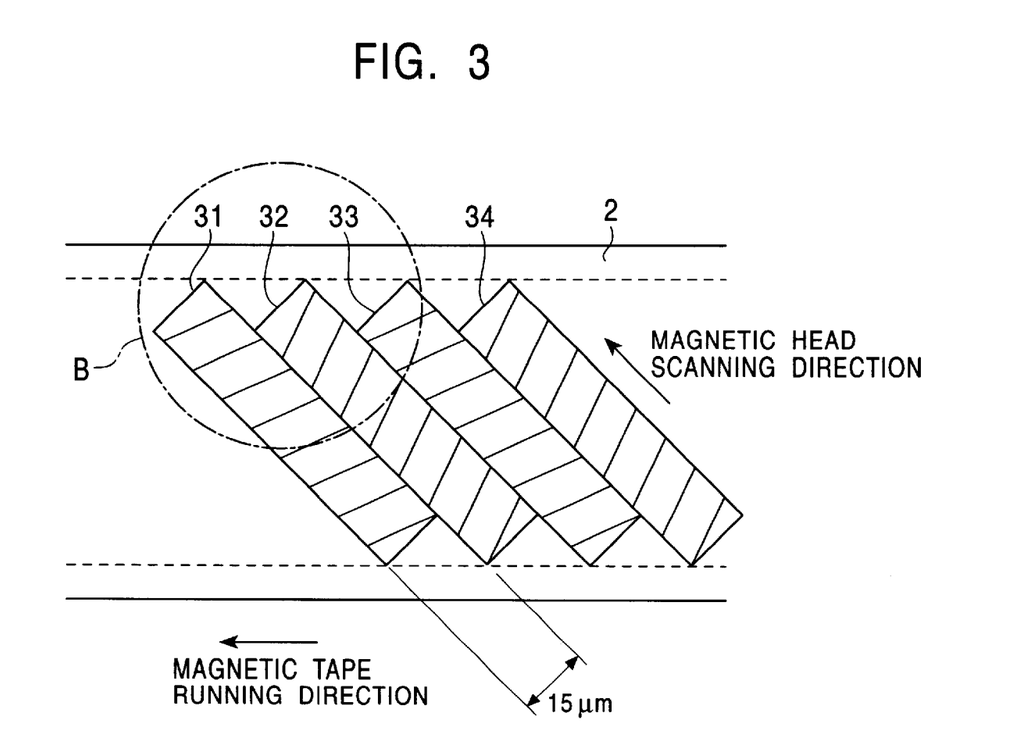
FIG. 3 illustrates a track pattern when the magnetic tape is recorded in the DVCAM format.

Recording formats of the magnetic tape 2 include, for example, the DV format and the DVCAM format. The DV format uses a recording track width of 10 (m, and the DVCAM format uses a recording track width of 15 (m. The two recording formats will now be described. FIG. 2 shows a track pattern formed by recording the magnetic tape 2 in the DV format. FIG. 3 shows a track pattern formed by recording the magnetic tape 2 in the DVCAM format.

In the DV format and the DVCAM format, video data and audio data are recorded as digital data, and the magnetic tape 2 which has a tape width of 6.35 mm is used. The rotating speed of the magnetic heads 4 and 5 for writing data is the same in both DV and DVCAM formats. The recording track width is made different based on the difference in the running speed of the magnetic tape 2.

In general, data is written by the two magnetic heads 4 and 5 having different azimuth angles. The magnetic heads 4 and 5 are arranged on the cylindrical surface of the rotating drum 6 and are opposed to each other at 180 degrees with respect to the rotation axis. The rotating direction of the rotating drum 6 is at a predetermined angle with respect to the magnetic tape 2. The magnetic heads 4 and 5 diagonally scan the magnetic tape 2 at this angle and form the track patterns shown in FIGS. 2 and 3.

In the DV format shown in FIG. 2, recording tracks 21, 23, and 25 formed by one magnetic head 4 are referred to as odd tracks, and recording tracks 22 and 24 formed by the other magnetic head 5 are referred to as even tracks. In the recording tracks 22 to 25, compressed and coded image signals, audio signals, and system information such as positional information are recorded. The rotating drum 6 is rotated at 9000 rpm, and the magnetic tape 2 runs at 18.831 mm/s. As a result, the track width of each of the recording tracks 21 to 25 is 10 (m.

In the DVCAM format shown in FIG. 3, as in the DV format, recording tracks 31 and 33, which are referred to as odd tracks, are formed by the magnetic head 4, and recording tracks 32 and 34, which are referred to as even tracks, are formed by the magnetic head 5. In the recording tracks 31 to 34, image signals, audio signals, and system information are recorded. When recording in the DVCAM format, the rotating speed of the rotating drum 6 is 9000 rpm, which is the same as in the DV format. The running speed of the magnetic tape 2 is 28.247 mm/s. Thus, the track width of each of the recording tracks 31 to 34 is 15 (m. In order that the magnetic recording apparatus 1 can record data in a plurality of recording formats by using the same rotating drum 6 which is provided with the magnetic heads 4 and 5, data is written in such a manner that data is overwritten in a portion adjacent to the recording track.

Figure 4:
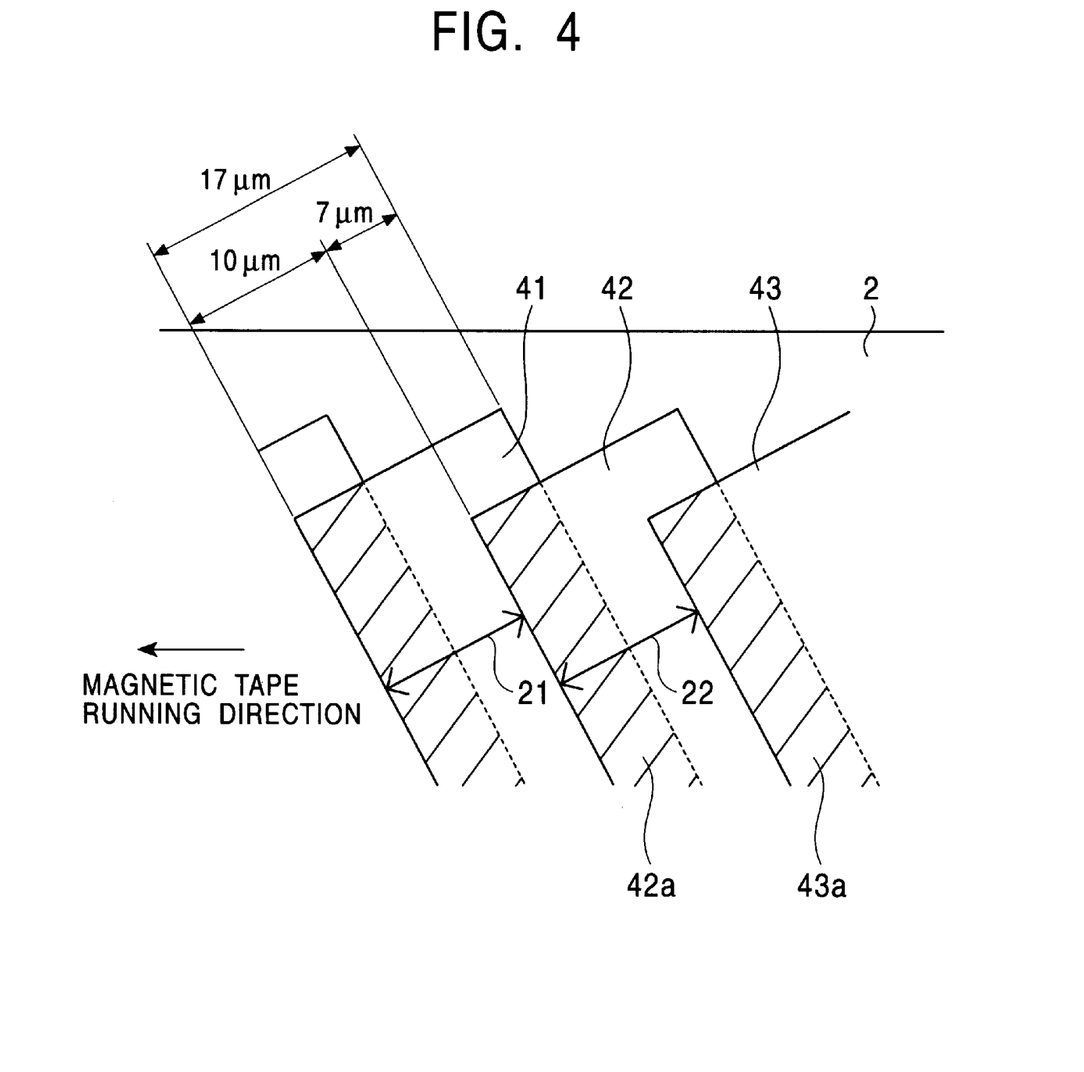
FIG. 4 is an enlarged view of section A in FIG. 2.
Figure 5:
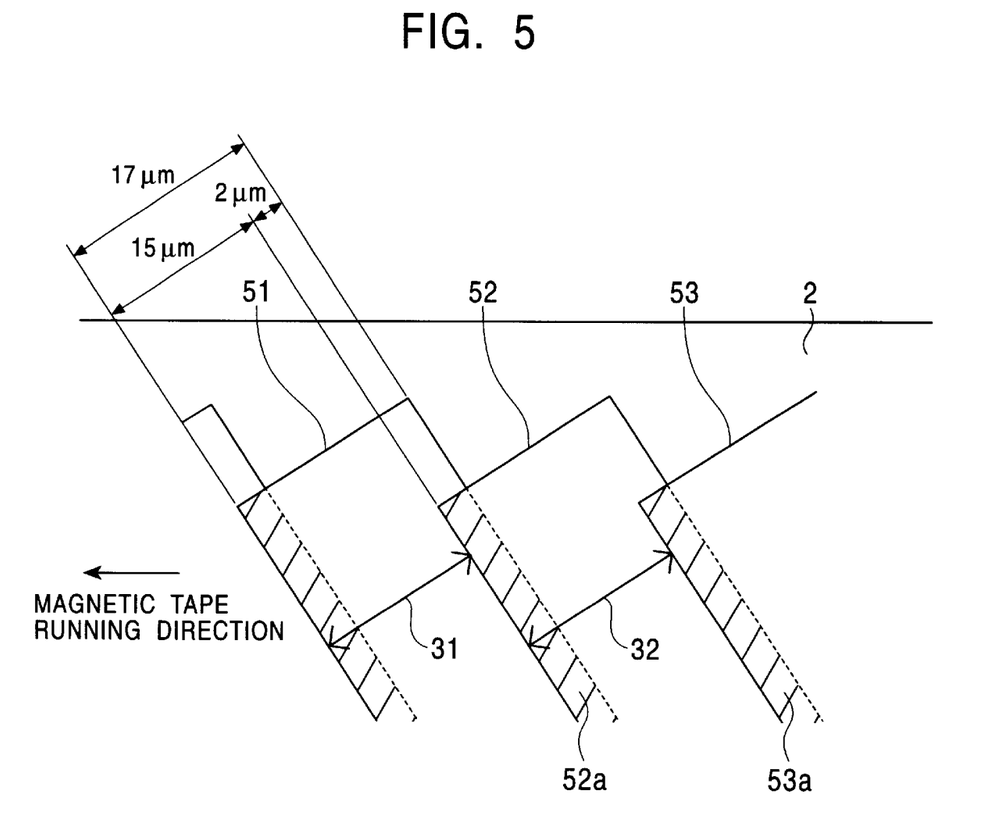
FIG. 5 is an enlarged view of section B in FIG. 3.

FIG. 4 is an enlarged view of section A in FIG. 2. FIG. 5 is an enlarged view of section B in FIG. 3.

The recording track width for the DV format is 10 (m, and the recording track width for the DVCAM format is 15 (m. The recording width of the magnetic heads 4 and 5 is larger than these recording tracks, namely, 17 (m. Assuming that the running speed of the magnetic tape 2 conforms to the specifications for the DV format and the DVCAM format, the area recorded by each of the magnetic heads 4 and 5 overlaps part of a recording track recorded by the previous scan. In the overlapping portion, old data is overwritten by new data.

In the DV format shown in FIG. 4, for example, a recording area 41 is recorded by the magnetic head 4. Subsequently, a recording area 42 is recorded by the magnetic head 5 in the subsequent scan. An overlapping portion 42a is overwritten by the magnetic head 5. When the subsequent scan is performed by the magnetic head 4, a recording area 43 is recorded, and an overlapping portion 43a is overwritten. As a result, the width of the overlapping portion 42a overwritten by the subsequent scan, that is, 7 (m, is subtracted from the recording width of the recording area 41 which is recorded by the magnetic head 4, namely, 17 (m, and data in an area with the recording width of 10 (m is used as the effective recording track 21. Similarly, the width of the overlapping portion 43a is subtracted from the recording width of the recording area 42, and hence data in an area with the recording width of 10 (m becomes effective as the recording track 22.

Similarly in the DVCAM format shown in FIG. 5, for example, a recording area 51 is recorded by the magnetic head 4, and a recording area 52 is recorded by the magnetic head 5 in the subsequent scan. An overlapping portion 52a is overwritten by the magnetic head 5. When the subsequent scan is performed by the magnetic head 4, a recording area 53 is recorded, and an overlapping portion 53a is overwritten. In this case, the running speed of the magnetic tape 2 is faster than that in the DV format. The width of the overlapping portion 52a overwritten by the subsequent scan, namely, 2 (m, is subtracted from the recording width of the recording area 51 by the magnetic head 4, that is, 17 (m. Thus, data in an area with the recording width of 15 (m becomes effective as the recording track 31. Similarly, the width of the overlapping portion 53a is subtracted from the recording width of the recording area 52, and hence data in an area with the recording width of 15 (m becomes effective as the recording track 32.

As described above, a lateral portion of an area recorded by the previous scan is overwritten by each scan performed by the magnetic head 4 or 5. The effective recording track width is changed to a desired width in accordance with the running speed of the magnetic tape 2. Thus, it is unnecessary to prepare the magnetic heads 4 and 5 for each recording track width in order to perform recording in a plurality of recording formats. As a result, a magnetic recording apparatus which has a fewer number of components and which is capable of recording in a plurality of formats can be implemented at a reduced manufacturing cost.

Figure 6:
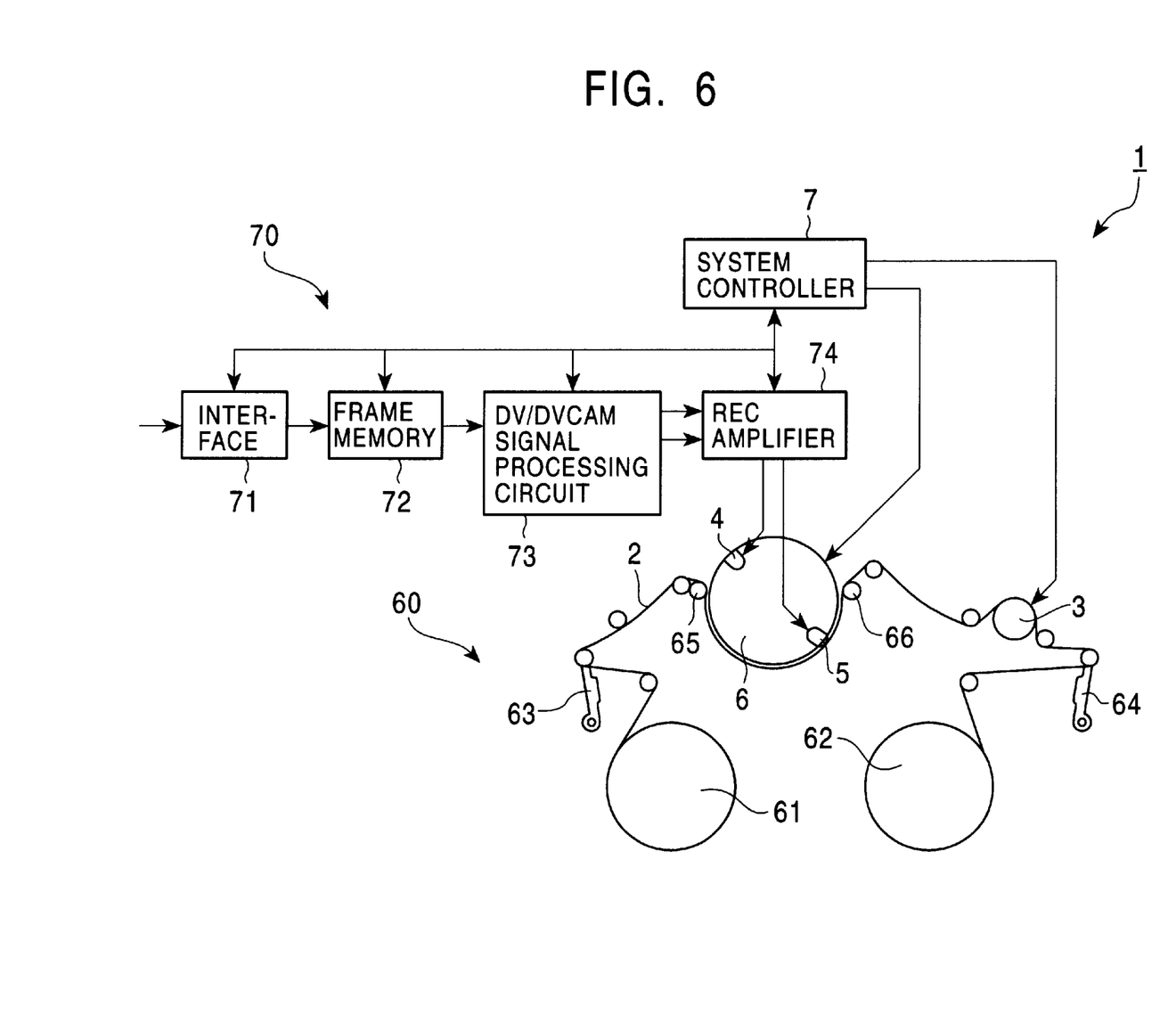
FIG. 6 is a block diagram of a driving mechanism and a control processing section of the magnetic recording apparatus according to the embodiment of the present invention.

FIG. 6 shows an example of the structure of a driving mechanism and a recording processing section of the magnetic recording apparatus 1 according to the embodiment of the present invention. In FIG. 6, the same reference numerals are given to components corresponding to those in FIG. 1.

A driving mechanism 60 of the magnetic recording apparatus 1 includes the capstan motor 3 for running the magnetic tape 2; the magnetic heads 4 and 5 for recording data on the magnetic tape 2; the rotating drum 6 for rotating and driving the magnetic heads 4 and 5 which are provided thereon; reels 61 and 62 for rewinding the magnetic tape 2; tension arms 63 and 64 for adjusting the tension of the magnetic tape 2; and guide rollers 65 and 66 for guiding the running of the magnetic tape 2.

The magnetic tape 2 is fed under a predetermined tension and at a predetermined speed by the rotation of the capstan motor 3. When the capstan motor 3 rotates, the magnetic tape 2 which is wound around the reel 61 is fed so that the magnetic tape 2 winds itself around the rotating drum 6 through the tension arm 63 by the guide rollers 65 and 66. The rotating drum 6 has a cylindrical shape. The magnetic heads 4 and 5, which are provided on the cylindrical surface, are opposed to each other at 180 degrees with respect to the rotation axis. The rotating drum 6 rotates at a predetermined angle with respect to the running direction of the magnetic tape 2. The magnetic heads 4 and 5 which are rotated and driven alternately scan the magnetic tape 2 and write data to the magnetic tape 2. The magnetic tape 2 on which data is written is released from the rotating drum 6, and subsequently the magnetic tape 2 is rewound on the reel 62 through the capstan motor 3 and the tension arm 64.

A recording processing section 70 includes an interface 71 to which an image signal is input; a frame memory 72 for storing data for one frame of the input image signal; a DV/DVCAM signal processing circuit 73 for converting the image signal in accordance with a recording format; a REC amplifier 74 for amplifying the converted image signal and transferring the amplified image signal to the magnetic heads 4 and 5; and the system controller 7 for controlling the operation of each component. These processing circuits are implemented as integrated circuits which are formed of, for example, semiconductor ICs including processors and volatile read only memories (ROMs).

The interface 71 is, for example, an IEEE 1394 interface or an input terminal to which analog images and audio are input. When the system controller 7 receives a recording start signal, the image signal is input frame by frame from the interface 71 to the frame memory 72. Under the control of the system controller 7, the DV/DVCAM signal processing circuit 73 reads the image signal from the frame memory 72 and performs predetermined signal conversion such as encoding, appending of system information, error correction, and 24/25 conversion. At the same time, the system controller 7 controls the rotating speed of the capstan motor 3 and the rotating drum 6. The signal that has undergone the predetermined processing is transferred from the DV/DVCAM signal processing circuit 73 to the REC amplifier 74 in accordance with the write timing of the magnetic heads 4 and 5. The signal amplified by the REC amplifier 74 is transferred to the magnetic heads 4 and 5 and is written on the magnetic tape 2. The system controller 7 drives the rotating drum 6 at a rotating speed of 9000 rpm. The system controller 7 controls the rotating speed of the capstan motor 3 in order that the running speed of the magnetic tape 2 is 18.831 mm/s in the DV format and 28.247 mm/s in the DVCAM format. The magnetic heads 4 and 5 write to the magnetic tape 2 while writing new data in a portion of an area recorded by the previous scan, which is adjacent to the currently written area. As a result, the same magnetic heads 4 and 5 can form a recording track width of 10 (m in the DV format and 15 (m in the DVCAM format on the magnetic tape 2.

Although the present invention is described with reference to the magnetic recording apparatus as the embodiment, the present invention is also applicable to a magnetic recorder and player capable of recording and playing a magnetic tape.

What is claimed is:

1. A magnetic recording apparatus for recording video data from an input image signal on a magnetic tape, comprising:
    a frame memory operably configured to store a frame of said input image signal;
    a signal processing circuit operably connected to said frame memory for processing said frame of said in one of a DV format and a DVCAM format;
    magnetic-tape running means for running the magnetic tape in a running direction;
    running-speed control means operably connected to said frame memory, said signal processing circuit, and said magnetic-tape running means for controlling the running speed of the magnetic tape;
    rotating and driving means which has a cylindrical shape and which rotates at a constant speed and at a predetermined angle with respect to the running direction of the magnetic tape; and
    data writing means which is provided on a cylindrical surface of said rotating and driving means and which is rotated, said data writing means scanning the magnetic tape at the predetermined angle and writing data to form a next recording track adjacent to a previous recording track such that the next recording track overlaps a predetermined portion of the previous recording track.

2. A magnetic recording apparatus according to claim 1, wherein said data writing means includes two magnetic heads provided at mutually opposing positions on said cylindrical surface of said rotating and driving means, separated by 180 degrees with respect to the rotation axis of said rotating and driving means, which write data by alternately scanning the magnetic tape.

3. A magnetic recording apparatus according to claim 1, wherein said running-speed control means controls the running speed of the magnetic tape in order that a remaining portion other than the predetermined portion of the previous recording track has a width of 10 µm.

4. A magnetic recording apparatus according to claim 1, wherein said running-speed control means controls the running speed of the magnetic tape in order that a remaining portion other than the predetermined portion of the previous recording track has a width of 15 µm.

5. A magnetic recording method for recording video data from an input image signal on a magnetic tape having a running direction, the method comprising the steps of:

scanning the magnetic tape by a magnetic head which rotates at a constant speed and at a predetermined angle with respect to the running direction of the magnetic tape and writing data to form a next recording track adjacent to a previous recording track such that the next recording track overlaps a predetermined portion of the previous recording track; and controlling the running speed of the magnetic tape in accordance with one of a DV format and a DVCAM format in order that a remaining portion other than the the predetermined portion of the previous recording track has a width equal to a predetermined value.

* * * * *